US008191793B2

(12) United States Patent
Byquist et al.

(10) Patent No.: US 8,191,793 B2
(45) Date of Patent: Jun. 5, 2012

(54) METHOD AND SYSTEM OF ADVANCED FAN SPEED CONTROL

(75) Inventors: Tod A. Byquist, Tukwila, WA (US); Michael T. Crocker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/378,559

(22) Filed: Feb. 17, 2009

(65) Prior Publication Data

US 2009/0228148 A1 Sep. 10, 2009

Related U.S. Application Data

(63) Continuation of application No. 11/093,682, filed on Mar. 30, 2005, now Pat. No. 7,490,479.

(51) Int. Cl.
*G05D 23/12* (2006.01)
*F24F 7/00* (2006.01)
(52) U.S. Cl. ........... 236/1 C; 236/49.3; 62/178; 62/209; 374/109

(58) Field of Classification Search .................... 62/178, 62/179, 207, 208, 209; 236/49.3, 1 C; 374/109
See application file for complete search history.

(56) References Cited

U.S. PATENT DOCUMENTS

| 4,061,848 | A  | * | 12/1977 | Sistig et al. ..................... 526/61 |
| 6,823,839 | B2 | * | 11/2004 | Yasui et al. ............... 123/339.12 |
| 2001/0029907 | A1 | * | 10/2001 | Algrain et al. ............ 123/41.29 |
| 2003/0037193 | A1 | * | 2/2003 | Larson et al. ................. 710/200 |
| 2004/0010289 | A1 | * | 1/2004 | Biggs et al. ....................... 607/2 |
| 2006/0052970 | A1 | * | 3/2006 | Arabi et al. .................... 702/132 |
| 2006/0109624 | A1 | * | 5/2006 | Hung ........................... 361/694 |

* cited by examiner

*Primary Examiner* — Marc Norman
(74) *Attorney, Agent, or Firm* — Robert D. Anderson (57) ABSTRACT

According to some embodiments, a method, system, and apparatus to provide thermal management control. In some embodiments, the method includes receiving, by a control mechanism, a plurality of temperature representative signals from a plurality of temperature sensors, receiving a command signal from the control mechanism by an output weighting matrix mechanism, and controlling at least one thermal cooling device with at least one weighted output signal from the output weighting matrix mechanism.

41 Claims, 5 Drawing Sheets

| | F1 | F2 | Fx |
|---|---|---|---|
| T1 | 1.0 | 1.0 | 1.0 |
| T2 | 1.0 | 0.5 | 0 |
| Tx | 0 | 0 | 0 |

METHOD AND SYSTEM OF ADVANCED FAN SPEED CONTROL

CROSS REFERENCE TO RELATED APPLICATIONS

This application is related and claims priority to U.S. patent application Ser. No. 11/093,682 titled "METHOD AND SYSTEM OF ADVANCED FAN SPEED CONTROL," which was filed on Mar. 30, 2005; this application is entirely incorporated by reference.

BACKGROUND

Electrical devices that include a number of electrical components (e.g., a power supply, a memory/storage device, a processor, etc.) continue to increase in complexity. Electrical components dissipate unused electrical energy as thermal energy that may reduce the reliability of the electrical components. The reliability of the electrical components and the electrical device may improve by managing the thermal energy created by the electrical components.

Thermal cooling devices such as fans may be used to cool an electrical device and the electrical components thereof. However, thermal management of the electrical device and the electrical components may be limited without an efficient thermal management controller.

DETAILED DESCRIPTION

The several embodiments described herein are solely for the purpose of illustration. Embodiments may include any currently or hereafter-known versions of elements and aspects of the various embodiments described herein. Therefore, persons skilled in the art will recognize from this description that other embodiments may be practiced with various modifications and alterations.

Figure 1:
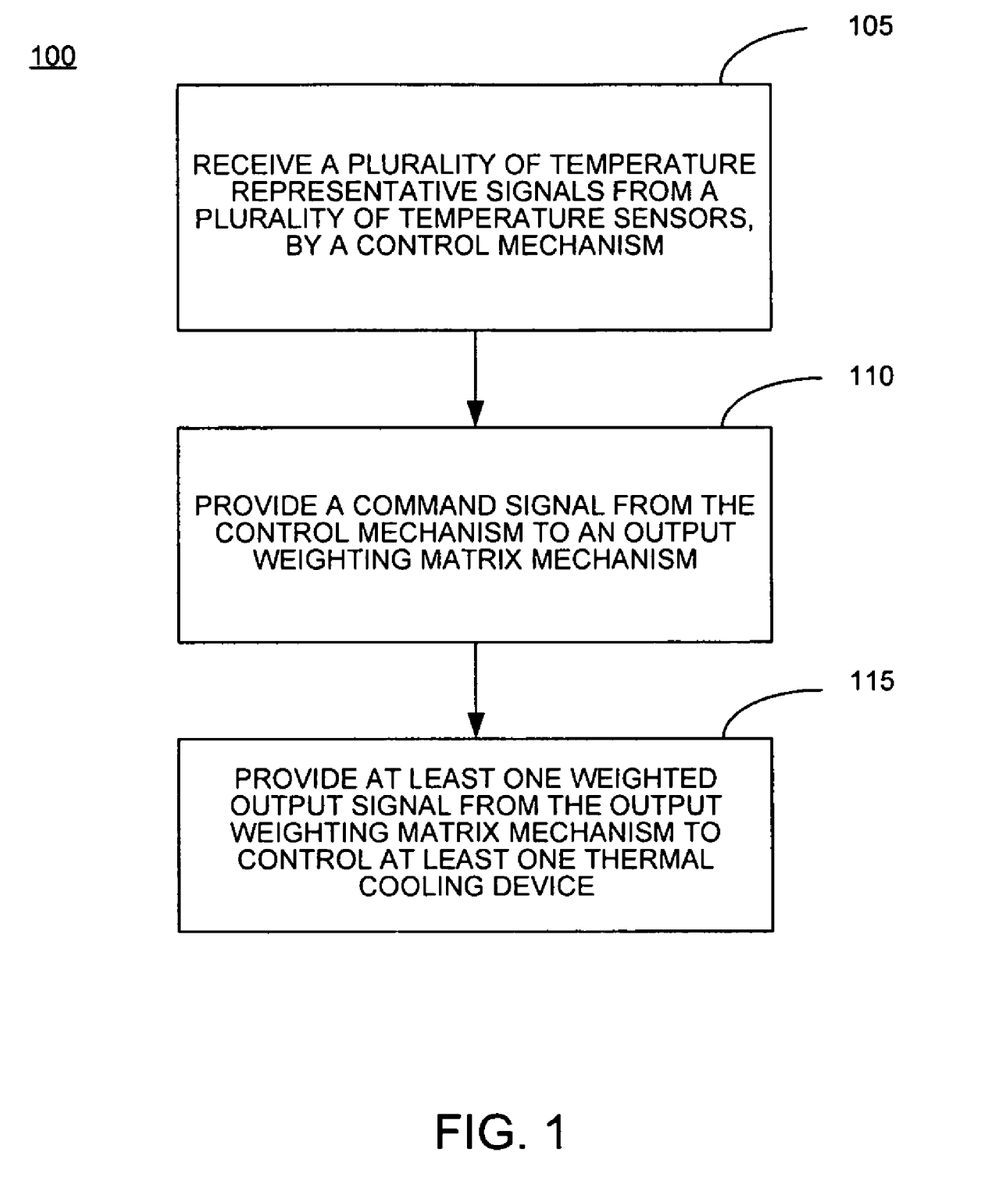
FIG. 1 is an exemplary flow diagram of a method, according to some embodiments hereof.

FIG. 1 is provides an exemplary flow diagram of a process 100, used in some embodiments herein, to provide a thermal management process. At operation 105, a temperature representative signal is received by a controller. In some embodiments, the temperature representative signal is representative of a measured temperature in a vicinity of a temperature sensor. A thermal cooling device may be located in a vicinity of the temperature sensor. The thermal cooling device may include a fan or other device suitable for dissipating thermal energy generated by an electrical component or device.

The received temperature representative signal may be provided by any number of different temperature measurement devices and techniques. For example, a thermal diode, a thermistor, and other temperature detection devices and sensors may be used to measure a temperature at various locations of an electronic device or component. For example, one or more locations such as a printed circuit board, a CPU or other integrated circuit, and/or ambient air within a chassis of an electronic device housing may be monitored for a temperature measurement.

In some embodiments, the temperature at a number of locations may be monitored, and a plurality of temperature representative signals may be provided. The plurality of temperature representative signals may include one temperature representative signal for each of the plurality of monitored temperatures. It should be appreciated that the particular number of temperatures monitored and the method or technique used for determining or acquiring the temperature representative signals indicative of the measured temperatures may vary.

The controller of operation 105 provides a mechanism, in response to a temperature representative signal, to control an operation of a thermal cooling device. The controller may provide a signal to control an operating parameter of the thermal cooling device. One such operating parameter that may be controlled by a signal from the controller may be, for example, a variable speed of a cooling fan.

In some embodiments, the controller of operation 105 may be a proportional controller. A proportional controller may provide an output, command, or signal that is proportional to an input, signal, command, measurement, or determination (e.g., a temperature difference between a set point temperature and a sensed temperature). In some embodiments, instead of a proportional only controller, the controller may be a proportional integral derivative (PID) controller. It will be appreciated that a PID controller offers control and response advantages as compared to a proportional only controller. The PID controller may be responsive to an error or change in the temperature representative signal (i.e., proportional), an amount of time the error is present (i.e., integral), and a rate of change of the measured temperature or error therein (i.e., derivative). The operation of a PID controller will be appreciated and understood by those in the art, thus a detailed discussion thereof is not provided in the present disclosure.

At operation 110, a command signal from the control mechanism (e.g., PID controller) is provided to an output weighting matrix. In some embodiments, the command signal from the control mechanism is based, at least in part, on the temperature representative signal. In some embodiments, the command signal from the control mechanism may be conditioned to be received by the output weighting matrix.

At 115, at least one weighted output signal from the output weighting matrix is provided to control at least one thermal cooling device. The output weighting matrix assigns a weight to a signal output therefrom. The weight assigned to the output signals of the output weighting matrix may vary an aspect of the output signal. For example, the assigned weight may operate to vary an amplitude, duration, timing, etc. of the output signal. In some embodiments, the weight assigned to an output signal from the output weighting matrix may be based on, for example, an application of the output signal, a control scheme, or other consideration. That is, different applications, control schemes, and other factors may be a determining criteria in the weight accorded to the output signal.

For example, depending on an application or perhaps interface connected to an output signal of the output weighting matrix, the output signal may have a weight of 1.0 (i.e., 100% of the output signal), 0.75 (i.e., 75% of the output signal), or any of a number of weights. In some embodiments, a thermal management scheme or criteria may be one determinant regarding the weight assigned to an output signal. For example, a maximum or desired temperature limit for a particular component or an electrical device, a maximum or desired temperature limit for a the electrical device, a sustained or prolonged temperature limit for an electrical component or device, a maximum or desired acoustic level for an electrical component or device, etc. may be considerations regarding the weight assigned to an output signal.

It should be appreciated that the value, range, and/or number of weights that may be assigned to an output signal from the output weighting matrix may vary. In some embodiments, the value, range, and/or number of weights assigned to an output signal may be based on, for example, a thermal management objective (e.g., temperature thresholds and limits), and other criteria such as, but not limited to, acoustic management objectives, reliability objectives, power limitations, etc.

In some embodiments, the various values (i.e., weight) assigned to an output signal from the output weighting matrix may be static (i.e., fixed). The static values may be predetermined and based on a number of factors. Factors may include, for example, an application, an operating efficiency, component operational specifications, etc. In some embodiments, the various values (i.e., weight) assigned to an output signal from the output weighting matrix may be dynamically determined and/or assigned. That is, the weight value assigned to an output signal from the output weighting matrix may vary, as opposed to being set or fixed at one value. For example, the weighted value(s) assigned to an output signal may vary based on a relationship such as, for example, an equation, an algorithm, a measured, determined, or calculated value, etc.

In some embodiments, the various values assigned to an output signal from the output weighting matrix may be a combination of static and dynamic values.

Figure 2:
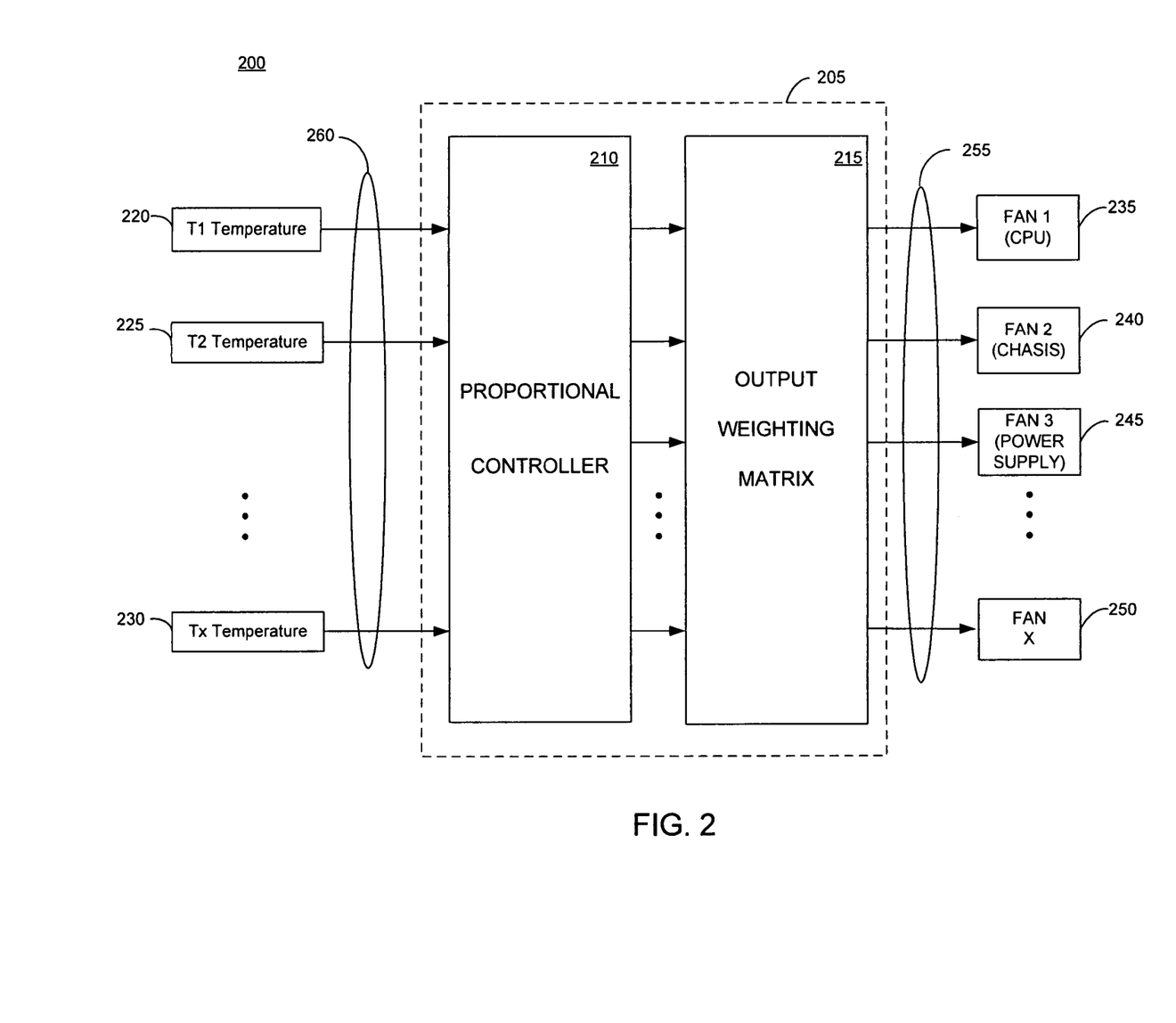
FIG. 2 illustrates an exemplary block diagram of an apparatus, according to some embodiments hereof.

FIG. 2 provides an exemplary block diagram of a system 200 in accordance with some embodiments herein. System 200 includes a thermal management controller 205 that provides thermal management control for a number of thermal cooling devices in response to a number of inputs thereto. Thermal management controller 205 includes a proportional controller 210 and an output weighting matrix 215. Proportional controller 210 and output weighting matrix 215 may operate in accordance with a thermal management process such as, for example, the thermal management process 100 shown in FIG. 1.

Thermal management controller 205 may receive a number of temperature representative signals 260 as inputs thereto. Thermal management controller 205 may receive a temperature representative signal from a number of temperature sensors 220, 225, and 230 that measure temperatures T1, T2, and Tx, respectively. It should be appreciated that the number of temperature representative signals 260 received by thermal management controller 205 may vary. Temperature sensors 220, 225, and 230 shown in FIG. 2 are provided to depict a concise and illustrative example of the temperature representative signals that may be provided to proportional controller 210 herein that is neither exhaustive nor limiting.

Thermal management controller 205 may provide a number of weighted output signals 255 as outputs therefrom. Weighted output signals 255 may be provided to control, at least in part, an operational parameter of thermal cooling devices 235, 240, 245, and 250. The thermal cooling devices may include, for example, CPU fan 235, chassis fan 240, power supply fan 245, and fan 250. The thermal cooling devices may be located at a variety of locations to provide thermal cooling to a variety of device locations. For example, fan 1 (235) may be located in the vicinity of a CPU to cool the CPU, fan 2 (240) may be located within a chassis of an electrical device to cool the ambient air therein, and fan 3 (245) may be located in the vicinity or on a power supply to cool the power supply.

Weighted output signals 255 may be provided to control, at least in part, an operational speed of fans 235, 240, 245, and 250. Efficient control of thermal cooling devices 235, 240, 245, and 250 may impact a reliability and/or acoustic performance of an electronic device and/or component that is cooled using thermal management device 205.

It should be appreciated that the number of weighted output signals 255 provided by thermal management controller 205 may vary. Thermal cooling devices 235, 240, 245, and 250 shown in FIG. 2 are provided to depict a concise and illustrative embodiment herein that is neither exhaustive nor limiting.

Figure 3:
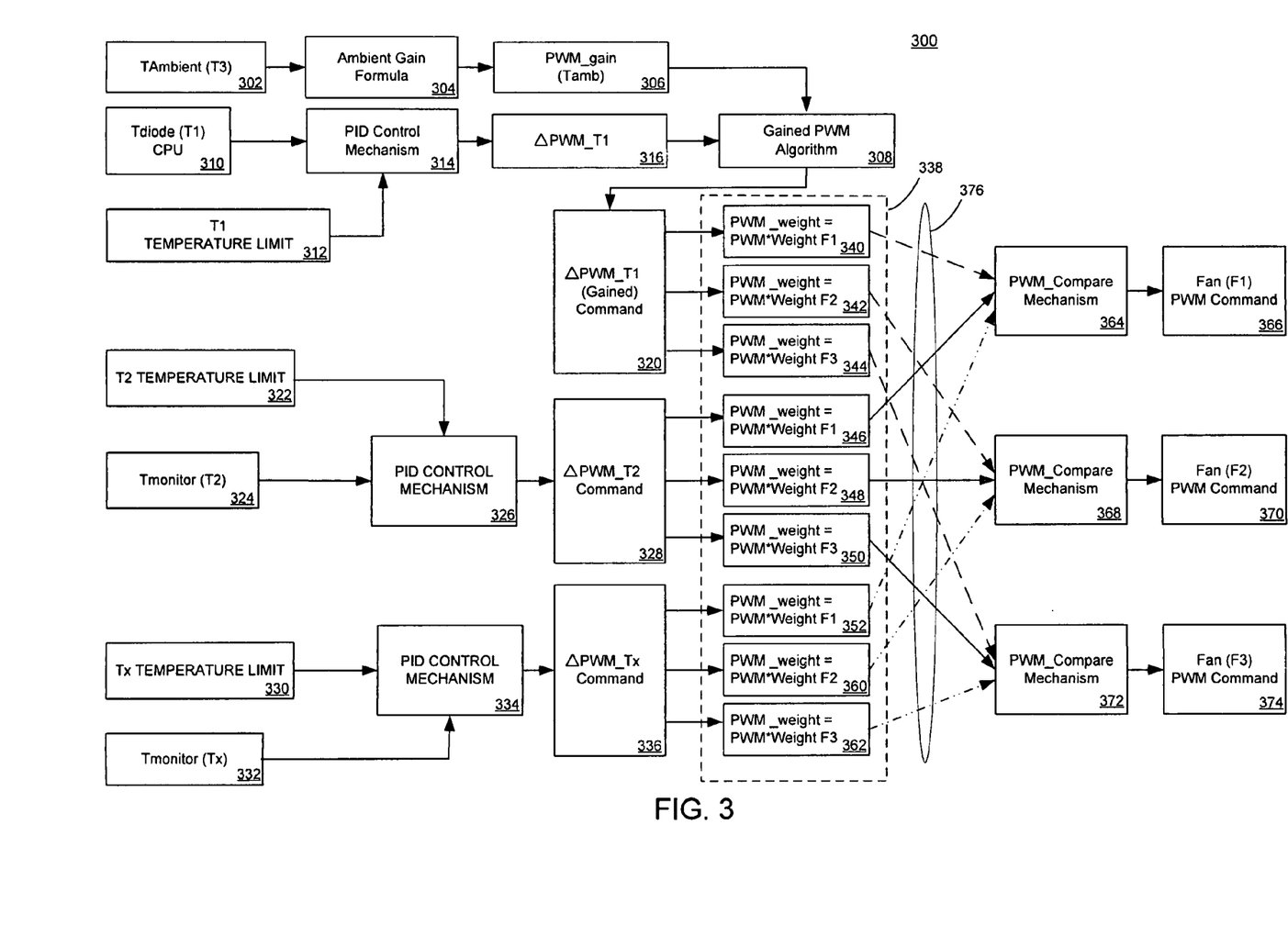
FIG. 3 is another exemplary block diagram, in accordance with some embodiments hereof.

Referring to FIG. 3, there is shown an exemplary block diagram of a system 300 in accordance with some embodiments herein. System 300 uses a pulse width modulation (PWM) control scheme to control a number of cooling fans. FIG. 3 includes a number of PID control mechanisms 314, 326, and 334. It should be appreciated that the number and type of controllers provided in system 300 may vary. The PID controllers generally have as inputs thereto a temperature representative signal and a temperature limit signal.

In some embodiments, system 300 provides thermal management for an electronic device having a CPU. A temperature, T1, in the vicinity of the CPU is measured by a sensor 310 including, for example, a thermal monitoring diode. A temperature, T3, in the vicinity of a fan also located near the CPU is measured by a sensor 302 including, for example, a thermistor. The thermistor may measure exhaust ambient air that passes through the fan.

A temperature representative signal from sensor 302 is subject to an ambient gain formula at 304 and is passed to a PWM amplifier 306 that generates a PWM gain (Tamb) signal. A temperature representative signal from sensor 310 is provided to PID control mechanism 314. PID control mechanism 314 receives a T1 temperature limit signal 312 that limits a response to temperature T1 provided by PID control mechanism 314. A value of the T1 temperature limit signal may be a function of the CPU monitored by temperature T1. PID control mechanism 314 provides a signal to device 316 that generates a signal regarding an amount of change for a pulse width modulation signal (ΔPWM). The PWM gain (Tamb) signal and ΔPWM signal are received and subject to a gained PWM algorithm at 308 that generates a signal regarding a PWM amount of change command signal (ΔPWM_T1 Gained) at 320. Thus, it is seen that system 300 provides a proportional controller with an ambient feedback gain control for a CPU temperature control loop.

PID control mechanism 326 receives a temperature representative signal from a temperature T2 sensor or monitor 324. PID control mechanism 314 also receives a T2 temperature limit signal 322 that limits a response to temperature T2 provided by PID control mechanism 326. PID control mechanism 326 provides a signal to device 328 that generates a signal regarding an amount of change for a pulse width modulation control signal for T2 (ΔPWM_T2). Output weighting matrix 338 receives a command signal for adjusting the PWM control signal for a cooling device associated with the location of the measured temperature T2 (e.g., chassis ambient air).

In a manner similar to that described for PID control mechanism 326 and temperature representative signal T2, PID control mechanism 334 receives a temperature representative signal Tx from a temperature sensor or monitor 332 and a Tx temperature limit signal 332. PID control mechanism 334 provides a signal to device 336 that generates a signal regarding an amount of change for a pulse width modulation control signal for T2 (ΔPWM_T2). Output weighting matrix 338 receives a command signal for adjusting the PWM control signal for a cooling device associated with the location of the measured T2 (e.g., a power supply).

Output weighting matrix 338 may provide a number of weighted output signals 376 to control a number of thermal cooling devices such as, for example, fans 366, 370, and 374. The weights assigned to the output signals of output weighting matrix 338 may be based on predetermined, selectable, static, or dynamic values. The weight assignment values may be based on control scheme algorithms, desired reliability criteria, desired acoustic criteria, and other considerations that may be related to design and/or performance considerations.

The thermal cooling devices may be located at a variety of locations to provide thermal cooling to a variety of device locations. For example, fan 1 (366) may be located in the vicinity of a CPU, fan 2 (370) may be located within a chassis to cool the ambient air therein, and fan 3 (374) may be located in the vicinity or on a power supply to cool the power supply. It should be appreciated that other locations may be monitored for temperature and that other types of cooling devices may be used in system 300, other than those shown in FIG. 3.

FIG. 3 shows an output weighting matrix 338 implemented using a number of devices 340-362 for assigning weights to output signals 376. It should be appreciated that the number of devices for assigning weights to output signals 376 may vary from one device to a plurality of such devices. It should also be appreciated that the particular basis for determining or assigning weights to output signals 376 may also vary form that depicted in FIG. 3. For example, FIG. 3 shows a formula in each of the weight assigning devices 340-362 that generally states that the assigned weight is equal to the PWM signal input thereto multiplied by the weight associated with the particular weight assigning device 340-362. Again, the particular basis for determining or assigning weights to output signals 376 may vary.

Weighted output signals 376 may be provided to a PWM comparator mechanism prior to being received at thermal cooling devices 366, 370, and 374. For example, the weighted output signals associated with controlling thermal cooling device 366 are first received by PWM comparator mechanism 364, the weighted output signals associated with controlling thermal cooling device 370 are received by PWM comparator mechanism 368, and the weighted output signals associated with controlling thermal cooling device 374 are received by PWM comparator mechanism 372. The PWM comparator mechanisms may compare the weighted output signals 376 received thereby and pass the weighted output signal(s) having the greatest value on to the thermal cooling device associated therewith.

The PWM comparator mechanisms may pass the weighted output signal having the greatest value to the thermal cooling device associated with the PWM comparator mechanism such that the thermal cooling system 300 provides at least a minimum cooling in accordance with the weighting scheme prescribed by output weighting matrix 338.

Weighted output signals 376 may be provided to control an operational speed of fan 1, fan 2, and fan 3. Efficient control of thermal cooling devices 366, 370, and 374 may effect the reliability and/or acoustic performance of an electronic device and/or component that is cooled by system 300.

Output weighting matrix 338 may provide a mechanism for controlling a plurality of thermal cooling devices (e.g., fans 366, 370, and 370) that is based on one temperature representative signal (e.g., T1). This is illustrated in FIG. 3 wherein output weighting devices 340, 342, and 344 provide output signals to PWM comparator mechanisms 364, 368, and 372 to control fan 1, fan 2, and fan 3, respectively. That is multiple thermal cooling devices (366, 370, and 374) are controlled based on a temperature representative signal from one temperature sensor (T1/T3).

Output weighting matrix 338 may provide a mechanism for controlling one thermal cooling device (e.g., fan 366) based on a plurality of temperature representative signals (e.g., T1, T2, and Tx). This is illustrated in FIG. 3 by the signals from output weighting devices 340, 346, and 352 that provide output signals to PWM comparator mechanism 364 to control fan 1 (366). That is one thermal cooling device (366) is controlled based on multiple temperature sensors (T1/T3, T2, and Tx).

It should be appreciated that based on the weights assigned to the output signal(s) of output weighting matrix 338, the number of temperature representative signals and the number of thermal cooling devices controlled thereby may vary.

Figure 4:
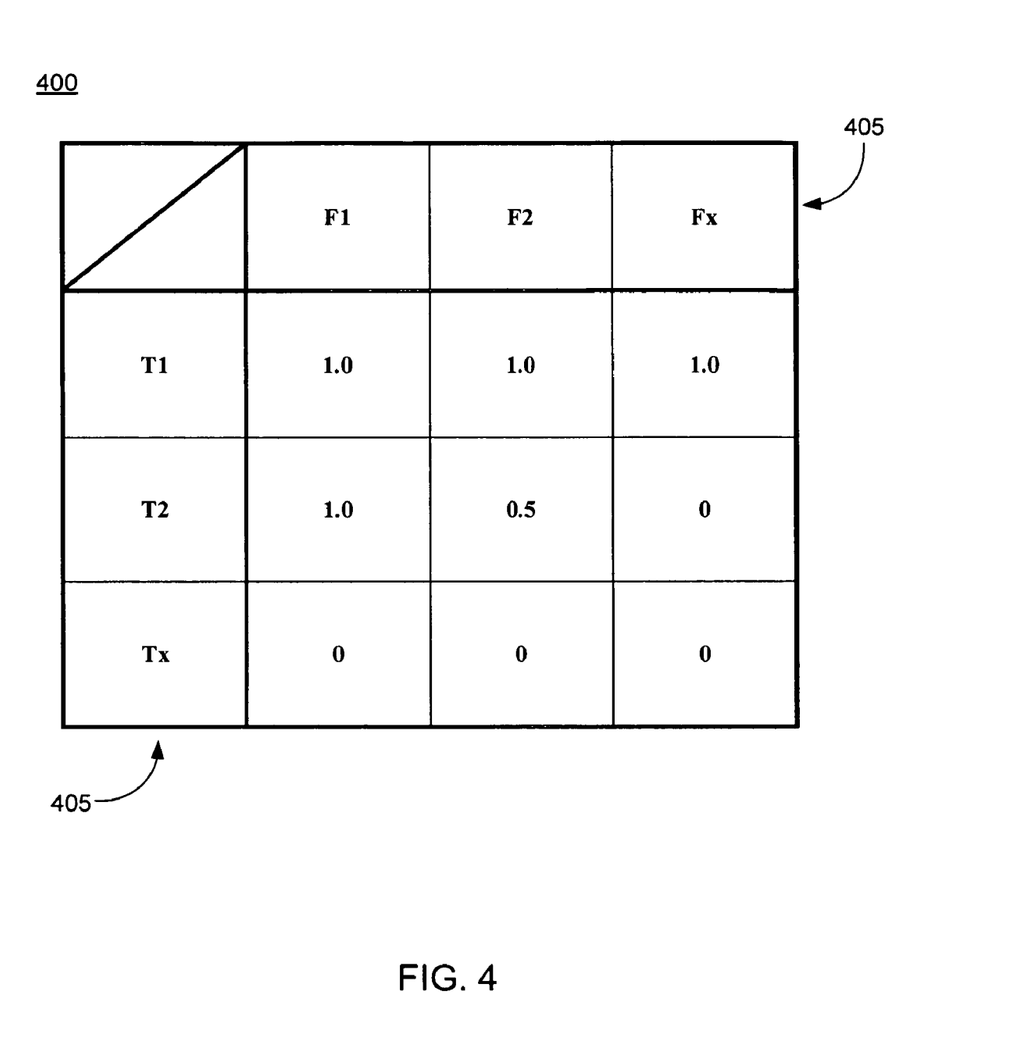
FIG. 4 is an exemplary illustration of an output weighting matrix, according to some embodiments hereof.

FIG. 4 is an exemplary block diagram of an output weighting matrix 400 in accordance with some embodiments herein. Output weighting matrix 400 provides an illustrative conceptual representation of weights assigned to control signals associated with a number of temperature representative signals T1, T2, and Tx (405) for controlling a number of thermal cooling devices fans F1, F2, and Fx (410). For example, for controlling fan 1 (F1) the temperature representative signal control signal T1 is assigned a weight of 1.0, for controlling fan 2 (F2) the temperature representative signal control signal T2 is assigned a weight of 0.5, and for controlling fan 3 (F3) the temperature representative signal control signal Tx is assigned a weight of 0. The assigned weight may correlate to a percentage of the amplitude value of the signal that is output by output weighting matrix 338. Thus, a weight of 1.0 may correlate to a 100% output of the control signal (e.g., T1), a weight of 0.5 correlates to a 50% output of the control signal (e.g., T2), and a weight of 0 correlates to a 0% output of the control signal (e.g., T2). It should be appreciated that the weight assignments illustrated in FIG. 4 are merely illustrative of but one example herein. In some embodiments, output weighting matrix 400 may be implemented in a look-up table stored in a memory.

Figure 5:
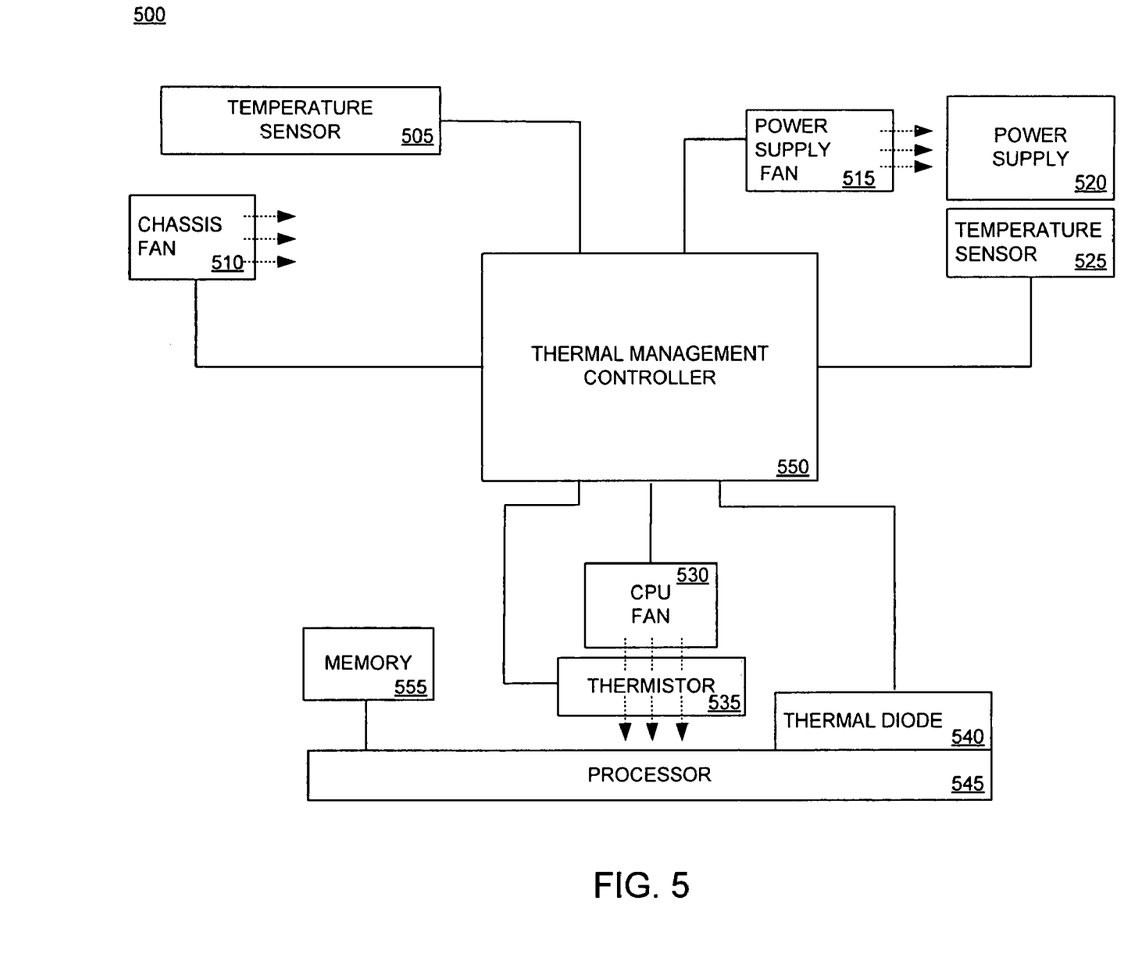
FIG. 5 is an exemplary block diagram of a system in accordance with some embodiments herein.

FIG. 5 is an exemplary block diagram of a system 500 in accordance with some embodiments herein. System 500 may include, for example, a temperature sensor 505 in a vicinity of a chassis fan 510 within a chassis of an electronic device; a temperature sensor 525 and a fan 515 in a vicinity of a power supply 520; a thermal diode 540, a CPU fan 530, and a thermistor 535 in a vicinity of a CPU 545; and a thermal management controller 550. Thermal management controller 550 may include a number of controllers and an output weighting matrix in accordance with some embodiments herein, such as system 200 and 300. The controllers comprising thermal management controller 550 may include a proportional controller, a PID controller, other types of control mechanisms, and combinations thereof. In some embodiments, fewer or more components than are shown in FIG. 5 may be included in system 500.

Processor 545 may be or include any number of processors, which may be any type or configuration of processor, microprocessor, and/or micro-engine that is or becomes known or available. In some embodiments, other electronic and/or electrical devices may be utilized in place of or in addition to processor 545. Processor 545 may, for example, be or include any device, object, and/or component that generates, stores, and/or requires removal of heat. According to some embodiments, processor 545 may be an XScale® Processor such as an Intel® PXA270 XScale® processor. Memory 555 may be or include, according to some embodiments, one or more magnetic storage devices, such as hard disks, one or more optical storage devices, and/or solid state storage. Memory 555 may store, for example, applications, programs, procedures, and/or modules that store instructions to be executed by processor 545. Memory 555 may comprise, according to some embodiments, any type of memory for storing data, such as a Single Data Rate Random Access Memory (SDR-RAM), a Double Data Rate Random Access Memory (DDR-RAM), or a Programmable Read Only Memory (PROM).

In some embodiments, chassis fan 510, power supply fan 515, and CPU fan 530 may coupled to thermal management controller 550. Chassis fan 510, power supply fan 515, and CPU fan 530 may, for example, remove and/or dissipate thermal energy in an interior space of a device chassis, in a vicinity of power supply 520, and in a vicinity of CPU 545 vicinity of a the processor 545, respectively by blowing air (e.g., represented by dashed arrows lines in FIG. 5).

Thermal management controller 550 may provide weighted output signals to control operational speeds of chassis fan 510, power supply fan 515, and CPU fan 530. The operational speed of fans 510, 515, and 530 may correspond to a cooling capacity of the fans. The operational speed of fans 510, 515, and 530 may have an impact on, for example, a reliability and/or acoustic performance of system 500.

Thermal management controller 550 may include an output weighting matrix. The output weighting matrix of system 500 may be similar to the output weighting matrix shown in FIGS. 2 and 3. In some embodiments, thermal management controller 550 provides a mechanism for controlling fans 510, 515, and 530 based on temperature representative signals received from temperature sensors 505, 525, 540, and 535.

In some embodiments, more than one of the multiple thermal cooling devices (i.e., fans 1, 2, and 3) may be controlled based on one of the temperature representative signals from one of temperature sensors 505, 525, and 535 and 540. In some embodiments, the one of the multiple thermal cooling devices (i.e., fans 1, 2, and 3) may be controlled based on a plurality of the temperature representative signals from temperature sensors 505, 525, and 535 and 540.

In some embodiments, thermal management controller 550 may provide a control mechanism or scheme for responding to temperature representative signals that may be varied based on, for example, a desired temperature response, a desired fan acoustic level output, or other considerations. For example, by assigning various weights to the controlling output signals from thermal management controller 550, a number of fans can be controlled to be responsive to, for example, a request to cool a CPU. That is, CPU fan 530 and chassis fan 510 may be responsive to provide cooling (i.e., increase speed of fans 530 and 510) cool processor 545. The combination of fans 530 and 510 may operate quieter or more efficiently than CPU fan 530 alone in cooling processor 545 in the desired manner.

In some embodiments, the mechanism for assigning weights to output signals of thermal management controller 550 (e.g., an output weighting matrix) may be predetermined and fixed. In some embodiments, the mechanism for assigning weights to output signals of thermal management controller 550 (e.g., an output weighting matrix) may be dynamic, capable of "self-optimizing". That is, the weights assigned the various out of thermal management controller 550 may have a starting value (e.g., default value) but the weights may change or be updated depending on observed system characteristics (e.g., received temperature representative signals). In some embodiments, the dynamic weight values may be used to update an output weighting matrix such as the table depicted in FIG. 4.

In some embodiments, the mechanism for assigning weights to output signals of thermal management controller 550 (e.g., an output weighting matrix) may be programmable or otherwise selectively changed. The changes may be implemented via a user input provide by a user interface.

In some embodiments, thermal management device 550 may be implemented in, for example, an integrated circuit, either as a discrete chip or together with other functional circuitry. In some embodiments, thermal management device 550 may be implemented as part of an interface controller hub (e.g., a chipset) that includes, for example, a system controller, peripheral controllers, and a memory controller.

The several embodiments described herein are solely for the purpose of illustration. Persons in the relevant art will recognize from this description other embodiments may be practiced with modifications and alterations, limited only by the claims.

What is claimed is:

1. An apparatus comprising:
   a controller adapted to receive a plurality of temperature representative signals, and adapted to output a command signal in response to one or more of the plurality of temperature representative signals; and
   an output weighting matrix adapted to receive the command signal from the controller and, in response thereto, output at least one weighted output signal, the output weighting matrix adapted to dynamically change the at least one weighted output signal;
   wherein at least one of the plurality of temperature representative signals is received from an ambient temperature sense circuitry including feedback gain control.

2. The apparatus of claim 1, wherein the controller comprises a proportional controller.

3. The apparatus of claim 1, wherein the controller comprises a proportional, integral, and derivative (PID) controller.

4. The apparatus of claim 1, wherein the at least one weighted output signal is to control a thermal cooling device.

5. An apparatus comprising:
   a controller adapted to receive a plurality of temperature representative signals, and adapted to output a command signal in response to one or more of the plurality of temperature representative signals; and
   an output weighting matrix adapted to receive the command signal from the controller and, in response thereto, output at least one weighted output signal, the output weighting matrix adapted to dynamically change the at least one weighted output signal;
   wherein the controller is adapted to receive at least one temperature limit signal associated with at least one of the plurality of the temperature representative signals.

6. The apparatus of claim 5, wherein the at least one of the plurality of temperature representative signals associated with the temperature limit signal is received from an ambient temperature sense circuitry including feedback gain control.

7. The apparatus of claim 5, wherein each of the plurality of the temperature representative signals is associated with one of the at least one temperature limit signals.

8. The apparatus of claim 5, wherein the temperature limit signal limits a response of the controller.

9. The apparatus of claim 5, wherein the controller comprises a proportional, integral, and derivative (PID) controller.

10. The apparatus of claim 5, wherein the at least one weighted output signal is to control a thermal cooling device.

11. The apparatus of claim 5, wherein the controller comprises a proportional controller.

12. A method comprising:
receiving, by a controller, a plurality of temperature representative signals from at least one of a plurality of temperature sensors;
providing a command signal that is responsive to the at least one of the plurality of temperature sensor from the controller to an output weighting matrix;
providing, in response to the command signal, at least one weighted output signal from the output weighting matrix;
controlling at least one thermal cooling device based on the at least one weighted output signal; and
dynamically changing the at least one weighted output signal;
wherein at least one of the plurality of temperature representative signals is received from an ambient temperature sense circuitry including feedback gain control.

13. The method of claim 12, wherein the controller comprises a proportional controller.

14. The method of claim 12, wherein the controller comprises a proportional, integral, and derivative (PID) controller.

15. The method of claim 12, wherein the thermal cooling device is a fan.

16. The method of claim 12, further comprising controlling a plurality of the at least one thermal cooling device based on one of the plurality of temperature representative signals.

17. The method of claim 12, further comprising controlling one of the at least one thermal cooling device based on more than one of the plurality of temperature representative signals.

18. The method of claim 12, further comprising associating a weight value with the at least one weighted output signal.

19. A method comprising:
receiving, by a controller, a plurality of temperature representative signals from at least one of a plurality of temperature sensors;
providing a command signal that is responsive to the at least one of the plurality of temperature sensor from the controller to an output weighting matrix;
providing, in response to the command signal, at least one weighted output signal from the output weighting matrix;
controlling at least one thermal cooling device based on the at least one weighted output signal; and
dynamically changing the at least one weighted output signal;
wherein the controller receives at least one temperature limit signal associated with at least one of the plurality of the temperature representative signals.

20. The method of claim 19, wherein the at least one of the plurality of temperature representative signals associated with the temperature limit signal is received from an ambient temperature sense circuitry including feedback gain control.

21. The method of claim 19, wherein each of the plurality of the temperature representative signals is associated with one of the at least one temperature limit signals.

22. The method of claim 19, wherein the temperature limit signal limits a response of the controller.

23. The method of claim 19, wherein the controller comprises a proportional controller.

24. The method of claim 19, wherein the controller comprises a proportional, integral, and derivative (PID) controller.

25. The method of claim 19, wherein the thermal cooling device is a fan.

26. The method of claim 19, further comprising controlling a plurality of the at least one thermal cooling device based on one of the plurality of temperature representative signals.

27. The method of claim 19, further comprising controlling one of the at least one thermal cooling device based on more than one of the plurality of temperature representative signals.

28. The method of claim 19, further comprising associating a weight value with the at least one weighted output signal.

29. A system comprising:
a controller adapted to receive a plurality of temperature representative signals;
an output weighting matrix adapted to receive a command signal from the controller and, in response thereto, output at least one weighted output signal, the output weighting matrix adapted to dynamically change the at least one weighted output signal;
a thermal cooling device controlled, at least in part, by the at least one weighted output signal;
a processor cooled by, at least, the thermal cooling device; and
a double data rate memory coupled to the processor;
wherein at least one of the plurality of temperature representative signals is received from an ambient temperature sense circuitry including feedback gain control.

30. The system of claim 29, wherein the controller adapted to receive a plurality of temperature representative signals is a proportional, integral, and derivative (PID) controller.

31. The system of claim 29, wherein a weight value is associated with the at least one weighted output signal and the weight value is dynamic.

32. The system of claim 29, wherein the controller comprises a proportional controller.

33. The system of claim 29, wherein the controller comprises a proportional, integral, and derivative (PID) controller.

34. The system of claim 29, wherein the at least one weighted output signal is to control a thermal cooling device.

35. A system comprising:
a controller adapted to receive a plurality of temperature representative signals;
an output weighting matrix adapted to receive a command signal from the controller and, in response thereto, output at least one weighted output signal, the output weighting matrix adapted to dynamically change the at least one weighted output signal;
a thermal cooling device controlled, at least in part, by the at least one weighted output signal;
a processor cooled by, at least, the thermal cooling device; and
a double data rate memory coupled to the processor;
wherein the controller is adapted to receive at least one temperature limit signal associated with at least one of the plurality of the temperature representative signals.

36. The system of claim 35, wherein the at least one of the plurality of temperature representative signals associated with the temperature limit signal is received from an ambient temperature sense circuitry including feedback gain control.

37. The system of claim 35, wherein each of the plurality of the temperature representative signals is associated with one of the at least one temperature limit signals.

38. The system of claim 35, wherein the temperature limit signal limits a response of the controller.

39. The system of claim 35, wherein the controller comprises a proportional, integral, and derivative (PID) controller.

40. The system of claim 35, wherein the at least one weighted output signal is to control a thermal cooling device.

41. The system of claim 35, wherein the controller comprises a proportional controller.

* * * * *

UNITED STATES PATENT AND TRADEMARK OFFICE
CERTIFICATE OF CORRECTION

| | | |
|---|---|---|
| PATENT NO. | : 8,191,793 B2 | |
| APPLICATION NO. | : 12/378559 | |
| DATED | : June 5, 2012 | |
| INVENTOR(S) | : Tod A. Byquist and Michael T. Crocker | |

It is certified that error appears in the above-identified patent and that said Letters Patent is hereby corrected as shown below:

On the Title Page and attached Figure 2, change the spelling at line 2 of item number 240 in Figure 2 from "CHASIS" to "CHASSIS".

Signed and Sealed this
Thirtieth Day of October, 2012

David J. Kappos
*Director of the United States Patent and Trademark Office*

(12) United States Patent
Byquist et al.

(10) Patent No.: US 8,191,793 B2
(45) Date of Patent: Jun. 5, 2012

(54) METHOD AND SYSTEM OF ADVANCED FAN SPEED CONTROL

(75) Inventors: Tod A. Byquist, Tukwila, WA (US); Michael T. Crocker, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 12/378,559

(22) Filed: Feb. 17, 2009

(65) Prior Publication Data
US 2009/0228148 A1 Sep. 10, 2009

Related U.S. Application Data

(63) Continuation of application No. 11/093,682, filed on Mar. 30, 2005, now Pat. No. 7,490,479.

(51) Int. Cl.
*G05D 23/12* (2006.01)
*F24F 7/00* (2006.01)

(52) U.S. Cl. .......... 236/1 C; 236/49.3; 62/178; 62/209; 374/109

(58) Field of Classification Search .............. 62/178, 62/179, 207, 208, 209; 236/49.3, 1 C; 374/109
See application file for complete search history.

(56) References Cited

U.S. PATENT DOCUMENTS

| | | | |
|---|---|---|---|
| 4,061,848 A * | 12/1977 | Sistig et al. | 526/61 |
| 6,823,839 B2 * | 11/2004 | Yasui et al. | 123/339.12 |
| 2001/0029907 A1 * | 10/2001 | Algrain et al. | 123/41.29 |
| 2003/0037193 A1 * | 2/2003 | Larson et al. | 710/260 |
| 2004/0010289 A1 * | 1/2004 | Biggs et al. | 607/2 |
| 2006/0052970 A1 * | 3/2006 | Arabi et al. | 702/132 |
| 2006/0109624 A1 * | 5/2006 | Hung | 361/694 |

* cited by examiner

Primary Examiner — Marc Norman
(74) Attorney, Agent, or Firm — Robert D. Anderson (57) ABSTRACT

According to some embodiments, a method, system, and apparatus to provide thermal management control. In some embodiments, the method includes receiving, by a control mechanism, a plurality of temperature representative signals from a plurality of temperature sensors, receiving a command signal from the control mechanism by an output weighting matrix mechanism, and controlling at least one thermal cooling device with at least one weighted output signal from the output weighting matrix mechanism.

41 Claims, 5 Drawing Sheets

FIG. 2